Sept. 18, 1923.

J. B. BLAIR 1,467,993

AUTOMOBILE SIGNAL

Filed Aug. 23, 1919

Inventor
James B. Blair
By Brown Boettcher & Dunner
Attorneys

Sept. 18, 1923.

J. B. BLAIR

AUTOMOBILE SIGNAL

Filed Aug. 23, 1919

Inventor
James B. Blair
By Brown Boettcher & Dienner
Attorneys

Sept. 18, 1923.

J. B. BLAIR

AUTOMOBILE SIGNAL

Filed Aug. 23, 1919

Inventor
James B. Blair
By Brown Boucher & Brown
Attorneys

Sept. 18, 1923.

J. B. BLAIR

AUTOMOBILE SIGNAL

Filed Aug. 23, 1919

Inventor
James B. Blair
By Mason Bottcher + Dunn,
Attorneys

Sept. 18, 1923.
J. B. BLAIR
AUTOMOBILE SIGNAL
Filed Aug. 23, 1919

Inventor
James B. Blair
By Brown Boettcher & Dienner
Attorneys

Sept. 18, 1923.

J. B. BLAIR 1,467,993

AUTOMOBILE SIGNAL

Filed Aug. 23, 1919

Inventor
James B. Blair
By Brown Boettcher + Dunner
Attorneys

Patented Sept. 18, 1923.

1,467,993

UNITED STATES PATENT OFFICE.

JAMES B. BLAIR, OF DECATUR, ILLINOIS; ORA MUELLER BLAIR, ADMINISTRATRIX OF SAID JAMES B. BLAIR, DECEASED, ASSIGNOR, BY MESNE ASSIGNMENTS, TO ORA MUELLER BLAIR, OF DECATUR, ILLINOIS.

AUTOMOBILE SIGNAL.

Application filed August 23, 1919. Serial No. 319,391.

*To all whom it may concern:*

Be it known that I, JAMES B. BLAIR, a citizen of the United States, residing at Decatur, in the county of Macon and State of Illinois, have invented a certain new and useful Improvement in Automobile Signals, of which the following is a full, clear, concise, and exact description, reference being had to the accompanying drawings, forming a part of this specification.

My invention relates to improvements in signals, and has special reference to automobile movement indicators.

The object of my invention is to provide an indicator for use on automobiles for informing pedestrians and others of the intentions of the driver of the automobile as to the next successive movement of the automobile, whether it be to slow down or stop the automobile, or to turn to the right or the left, or to give a combined notice of the intention to stop the automobile with the added intention of turning to the right or to the left upon again starting the automobile.

I have arranged my device to convey the necessary information by the universally understood language of the " hand " rather than by the display of the words " Stop," " Right " and " Left," or similarly significant words.

I project a hand signal from the side of the casing of the device to show which direction I intend to turn, and I project a hand from the top of the casing to indicate my intention to slow down or stop.

I arrange the direction hands under the direct control of the driver, and for reasons of safety, I arrange the stop hand to operate automatically on applying the brake, so that whenever the brake is applied to slow down or stop the automobile, the "stop" indicator or signal is displayed.

I arrange the direction hands at the rear and at the front of the automobile, so that those in front of the machine, as well as those following, may know the intention of the driver as to turning. This is of great importance on busy corners, as the traffic policeman is thus apprised of the intention of the driver and in many instances can signal him individually to make a turn and thus expedite traffic.

It is the object of my invention to improve and simplify the construction and operation of such indicators, to provide an indicator for this purpose in which the displayed hands shall be automatically illuminated at night, or when the tail light is illuminated. It is also my object to provide a device of this character in which the direction indicating members shall be operated electro-magnetically, which shall be locked in non-indicating position within the casing until released by the closing of the operating circuit; to provide pivotal mountings for the hands, or signals, which shall reduce the friction of movement to a minimum, and which shall be durable and capable of manufacture at low cost.

It is a further object of my invention to provide indicator hands made of pressed sheet aluminum, and means for mounting these hands on their pivots which shall be simple to manufacture and durable in use; to provide durable bumpers against which the movable indicating members contact when they drop within the casing; to provide means for mounting the indicator casings in vertical position both on the fender at the rear and on the radiator at the front of the automobile, which mounting shall be simple, durable and easily adjustable to properly position the casing, and to prevent undue strain, particularly upon the radiator and its filling nozzle.

It is also my object to provide an electrically operated signal for use on an automobile, in which the current consumption shall be reduced to a minimum, and in the installation of which the necessary wiring and connections shall be simple and easily accomplished, which shall be so arranged that substantially no soldering of joints is necessary, and which can be easily and quickly installed.

It is also my object to provide an automatic operator for the stop hand, of simple character, adapted to be controlled by the brake mechanism, and which automatically causes the display of the stop signal upon the setting of the brakes.

It is also my object to provide a device for use in connecting the wires of the various circuits, which shall facilitate and simplify the installation of the device upon a car.

It is also my object to provide a simple and effective automatic switch device in connection with the electro-magnetic operator of the signals, which effects the lighting of the lamps for illuminating the signals when the signals are displayed.

For a clear understanding of my invention, attention is directed to said drawings, in which:

Figure 1 is a side elevation of an automobile equipped with a signal system in accordance with my invention;

Figure 4^A is a fragmentary elevational view showing the details of the latching mechanism for the central stop signal arm.

Figure 13 is a top plan view; and Figure 14 is a side elevation of the circuit breaker which I use in connection with the brake mechanism for automatically displaying the stop hand;

Figures 1, 4A:
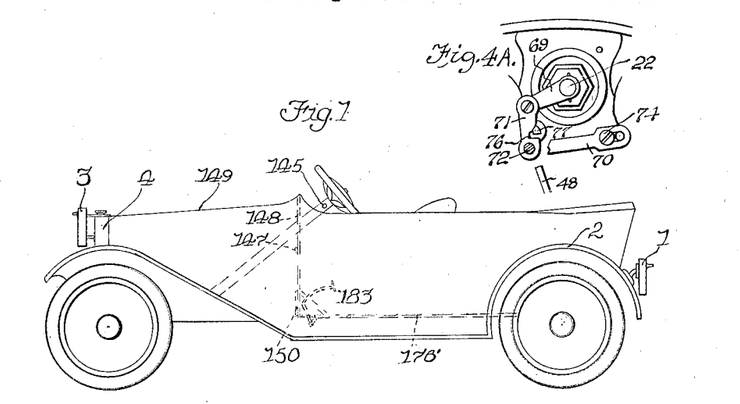
Figure 2:
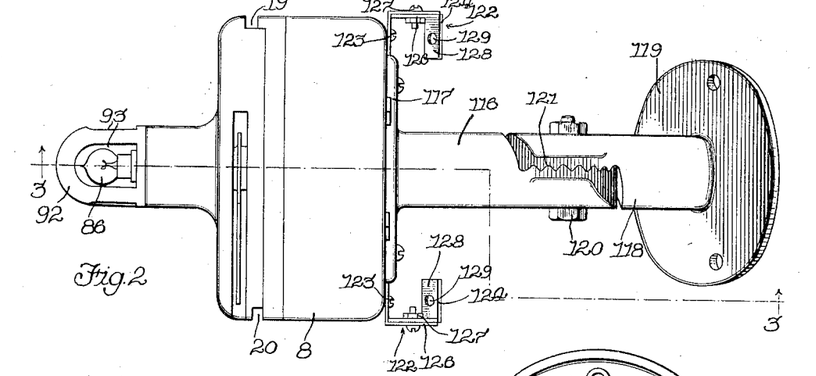
Figure 2 is a top plan view of the indicator which I use at the rear end of the automobile.

As illustrated in Figure 1, I arrange the rear indicator 1 preferably upon the rear part of the left hand mud guard 2, and in position to be plainly seen by drivers of cars approaching the automobile from the rear, and I arrange the forward indicator 3 upon the front of the automobile preferably attached to and depending in front of the radiator 4, and in position to be clearly seen from a position in front of the automobile. The rear indicator is arranged to notify those in the rear of the automobile of the intention of the driver to turn to the right or to the left, or to slow down or stop, and the forward indicator is arranged to notify those in front of the automobile of the intention of the driver to turn to the right or to the left.

As the rear indicator includes both direction and stop indicating devices, I will first describe this form in detail.

The indicator comprises a vertically elongated casing 5 divided vertically into a front cover member 6, a main casing or middle member 7, and a rear cover member 8. For the sake of lightness, I preferably make all of these members of aluminum. I securely bolt these several sections together to form the complete casing 5, by four bolts 9, which project thru the rear cover 8 and the intermediate member 7, and are threaded at their forward ends into threaded holes provided in the front cover member 6.

The intermediate or middle member 7 comprises a transverse partition wall 10 provided on its front and rear faces with shallow marginal walls 11 and 12, and upon this member the operative mechanism of the indicator is mounted and secured.

The rear cover member 8 is provided with a relatively deep marginal wall 13 which projects forward to meet the wall 12 and form a housing of sufficient depth to receive and enclose the operating solenoids. The front cover member 6 is also provided with a marginal wall 14 which is deep enough to provide ample space to house the indicator hands or signals, which I arrange upon the forward side of the partition 10.

This construction is such that when the bolts 9 are removed, the forward and rear cover members are free to be removed from the middle member and all of the operating parts of the device are fully exposed for examination, adjustment, repairs, etc.

Besides tightly clamping the front and rear cover sections of the casing upon the middle casing by the bolts 9, I dowel the several sections, to hold them in accurate register with each other. For this purpose, I provide the front cover member 6 with parallel spaced posts 6' projecting inwardly from the bottom marginal wall, and providing dowel spaces 6" between them, and I provide dowel posts 10' rising from the middle wall 10 adapted to fit in said dowel spaces 6'''.

At the upper end of the casing I provide curved doweling projections 10" on the middle wall 10 adapted to fit within the curved upper wall on the front cover member. I provide similar means for doweling the rear cover member 8 upon the middle member 7.

Figure 4:
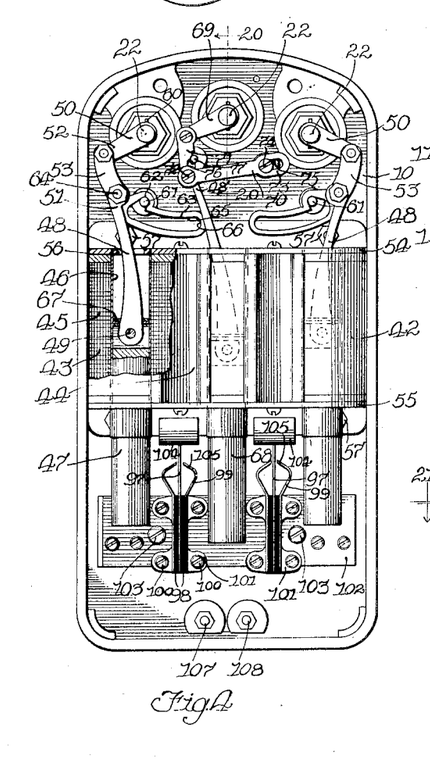
Figure 4 is a rear elevational view of the indicator with the rear cover removed to show the operating mechanism in elevation.
Figure 5:
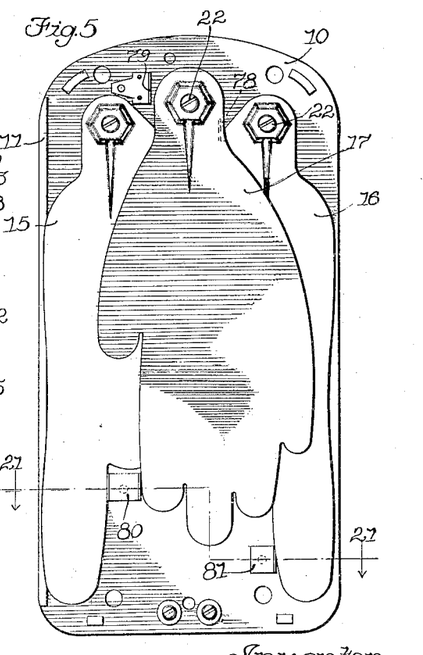
Figure 5 is a front elevational view of the indicator with the front cover plate removed.
Figure 6:
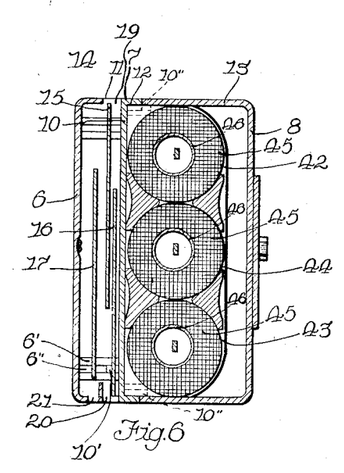
Figure 6 is a horizontal section of the indicator substantially on the line 6—6 of Figure 3.
Figure 7:
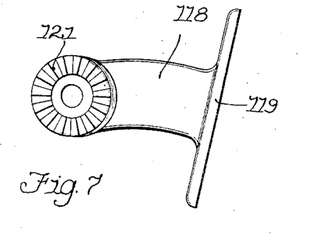
Figure 7 is a side elevation of the bracket upon which I mount the rear indicator.

The signal members comprise a right hand direction signal member 15, a similar left hand signal member 16, and a stop signal 17. I preferably mount these several members in the upper part of the housing on the partition 10, the direction signals one at each side and the stop signal at the center, as best shown in Figures 4 and 5. I arrange these signals in the front part of the housing beneath the cover member 6. I hang each of these members on separate pivotal supports 18 which project through the partition 10, and the rear ends of which are adapted to be engaged by the operating mechanism which I provide mounted upon the rear face of the partition 10 and beneath the rear cover member 8.

Figure 22:
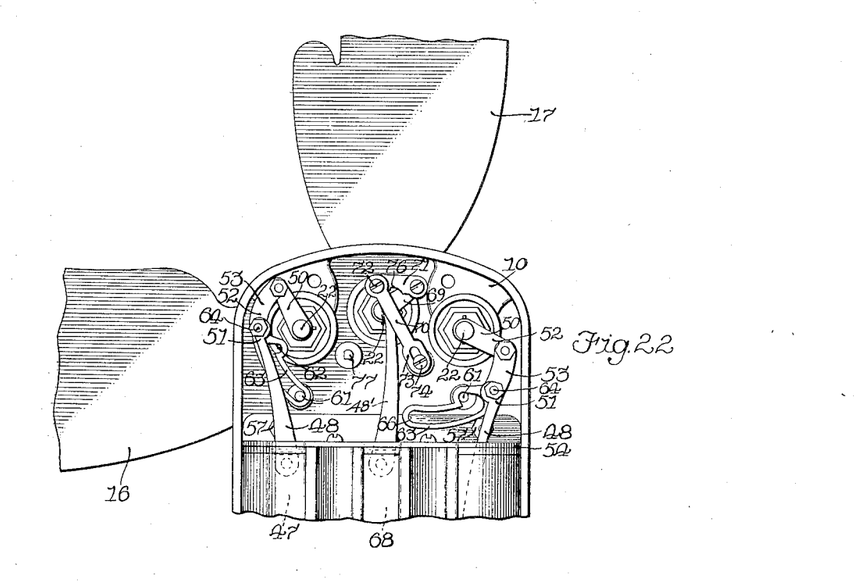
Figure 22 is a fragmentary view similar to Figure 4, but showing the indicator hand and the stop signal in indicating positions.

I provide the casing with a slot 19 in one side wall of the front cover member 6, through which the right hand signal member 15 can swing to indicating position. I provide a slot 20 in the opposite side wall of the cover and closed at its rear by the middle member 7, and thru which the left hand signal member can swing, and I provide a third slot 21 in one side of the front cover member 6, and extending around into the upper wall of the front cover member to permit the stop hand 17 to swing out from a depending position within the casing to a position where it projects upwardly from the top of the casing, as illustrated in Figure 22. The signals hang in overlapped relation, and wholly within the casing, when not swung out to indicating positions. The signals are swung to indicating position by electro-magnetic means, and are returned to non-indicating position by gravity.

Figure 20:
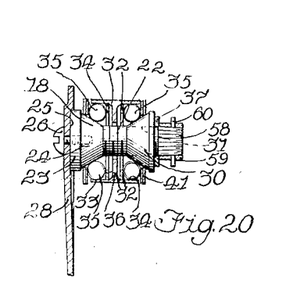
Figure 20 is an enlarged vertical sectional view thru the ball bearing mounting of one of the indicator hands taken on the line 20—20 of Figure 4.

I preferably make these signals 15, 16 and 17 of sheet aluminum, so that they will be light in weight and easily moved by the solenoids I provide, without an excessive use of current, and I provide means pivotally mounting these sheet metal members which are permanent in character, exceedingly durable, and capable of withstanding the strain of operation and the shocks incident to the dropping of the members from indicating to non-indicating positions, without loosening the members from their pivots and without distorting or fracturing the members themselves. For this purpose, as best shown in Figure 20, I provide the pivot members 18, each of which comprises a cylindrical pivot pin 22 provided with an enlarged thin polygonal head 23, preferably hexagonal in outline, and provided with a cone ball race 24 just beneath the head 23. For mounting the signals upon the pivots, I provide the pivotal ends of the signals each with a shallow hexagonal depression 25, in which the head 23 seats and fits, and I hold these two members tightly clasped together by means of a screw 26 projecting thru a central hole 27 in the signal member and threaded into a central screw hole in the end of the pivot pin 22. As the pivot pin is rotatably interlocked with the signal member by means of the enlarged hexagonal head, there is no tendency, in operation, to loosen the clamping screw 26. Furthermore, the enlarged head 23 and its engagement with the pivoted end of the signal member, as described, reduces the strain between these two parts to a point where the aluminum of which the signal member is made is not crushed or otherwise distorted by operation, and consequently this connection is practically permanent in character. To stiffen the base portion of the signal member in a direction at right angles to the plane of the signal, I form a stiffening rib 28 extending from the depression 25 longitudinally of the signal member and tapered toward its outer end. This rib forms a brace which prevents the signal member buckling adjacent to its mounting on the head 23, and permits the signal members to be made of thinner metal sheets than otherwise. I form this brace by pressing the body of the signal outwardly, forming a tapered groove 29 in its inner face, which is equal in depth at its base with the depth of the depression 25. It should be understood that the marginal wall of the depression 25 and the brace 28 combine to make the pivoted end of the signal members rigid and strong to resist operating and distorting strains.

Figure 3:
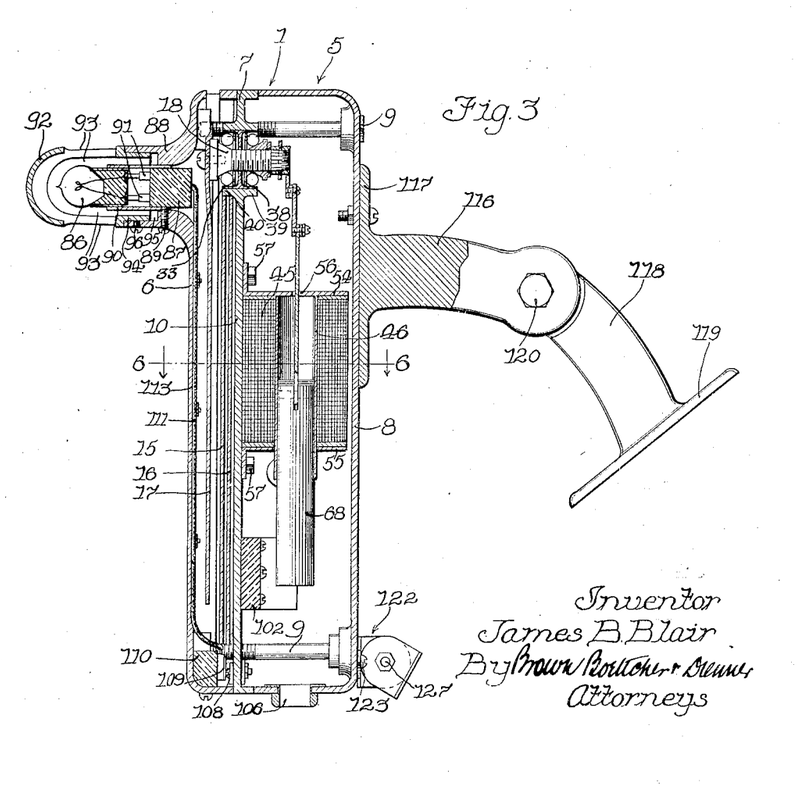
Figure 3 is a central vertical sectional view of the indicator on the line 3—3 of Figure 2.

For mounting the pivot pin 22 in the wall 10 of the casing, I provide a second cone race 30, Figure 20, threaded upon the outer end 31 of the pin 22, and between the two cones 24 and 30 I provide two anti-friction ball cages 32 mounted in an outer cylinder bearing member 33. This outer member provides a cylindrical ball race 34 at each end, one for co-operating with each ring of balls 35, carried by the ball cages 32. The bearing member 33 is provided with a central, inwardly projecting circumferential wall or partition 36 for separating the cages 32, and against which said cages are positioned and held. The adjustable cone 30 is adjusted longitudinally of the pivot pin 22 to cause the balls 35 to properly contact therewith, with the cone 24 and the outer cylindrical bearing surfaces 34, and is locked in adjusted position by the lock nut 37. As best shown in Figure 3, the outer circumferential bearing member 33 is mounted in a cylindrical bore 38 provided in the upper part of the middle partition wall 10 of the member 5. I provide bosses 39 and 40 projecting respectively forwardly and rearwardly from the wall 10, in which I make the bore 38. I preferably provide soft washers 41 mounted on the cones 24 and 30 at their outer edges to assist in closing the ends of the bearing and retaining the lubricant within the bearing, and in assembling the bearings I preferably pack them with some semifluid lubricant, such as vaseline. As explained, the signals are arranged on the forward side of the partition 10 and the operating mechanism on the rear side thereof.

The operating mechanism comprises a solenoid 42 for the left hand signal 15, a similar solenoid 43 for the right hand signal and, in the rear indicator, a similar solenoid 44 for the stop signal. Each solenoid consists of a suitable cylindrical coil 45 provided with a central tubular guide 46 and a solid cylindrical soft iron or soft steel core 47. When at rest the upper end of the core 47 is about the middle of the coil 45, and the lower end projects down below the coil, as best shown in Figure 4. To connect the cores with the signals, I provide suitable linkage. For the right hand signal 16 I provide a vertical link 48 pivotally connected at its lower end to the upper end of the core 47 by the pin 49, the upper end of the core being slotted to receive the lower end of the link. For connecting the upper end of this link to the pivot pin 22, I provide a crank arm 50, which I securely and tightly mount on the rear end of the pivot pin 22 by a method to be hereinafter more fully described, and I link the upper end 51 of the link 48 to the free end 52 of the crank arm 50 by a short link 53 connecting the several parts by means of suitable pivot pins at the several connecting points. The solenoids are mounted on the wall 10 by means of sheet metal angle brackets 54 and 55 at the top and bottom of the solenoids respectively. The upper bracket is provided with transversely extending guide slots 56 thru which slots the links 48 project. The brackets are secured to the wall 10 by bolts 57.

For the purpose of tightly and firmly securing the crank arms 50 upon the pivot pins 22, I knurl the inner end 58 (Figure 20) of each pin 22, providing them with longitudinally extending fine ridges 58, alternating with similar grooves. I also make this end slightly tapered, as shown, and I provide the hub 59 of the crank arm 50 with a central hole of a diameter to permit the small outer end of the pin 22 to enter and then I force the hub onto the pin by heavy pressure. The pin being made of steel and the crank arm of brass, the ridges 58 on the pins force their way into the metal of the hub, and provide a circumferential interlocking of the arm and pin which is permanent and effective to withstand the strains and shocks of operation. To prevent the hub 59 working off of the pin longitudinally, I drill a hole transversely thru the hub and the pin after I have forced the hub on as above described, and drive in a retaining pin 60. This form of connection is substantially permanent and will not work loose in use.

As the signals hang from their upper ends, they would have a tendency to swing transversely of the housing, due to the swaying of the automobile, and such swinging is undesirable, both from the point of view of appearance and noise. I therefore provide means to lock the several signals against movement until they are operated by the closing of the operating circuits. For this purpose I provide a part or member connected with the linkage which locks the parts against movement until unlocked by the upward movement of the core 47 and link 48. In the case of the two side signals 15 and 16 this lock comprises in each instance a stationary pin or projection 61 mounted upon the wall 10 and adapted to engage in a notch 62 which I provide in an extension 63 of the link 53. The pin 61 is substantially in alignment with the core 47 and at one side of the pivot 64, which connects the links 48 and 53. The notch 62 forms an offset in the upper wall of a curved guide slot 65 formed in the extension 63. One wall of the notch 62 is in alignment with the adjacent end of the slot 65 and consequently when force is applied to lift the core 47 the first result is to lift the lower end of the link 53, or in other words the extension 63, and thus free the linkage from the locking pin 62. Further lifting force applied to the core 47 causes the rotation of the pin 22, and the swinging out of the signal arm, the extension 63 or in other words the link 53, being guided in such movement by the pin 62 as it remains in the curved slot 65. The inner end 66 of the slot 65 forms an effective stop to prevent overthrow of the signal arm. To prevent too severe a strain on the linkage, due to the hammer-like blow of the rising core 47, I provide a cushion 67 comprising several soft washers or rings on the top of the core 47 surrounding the lower end of the link 48 and adapted to contact with the under side of the supporting bracket 54 when the core reaches the upper limit of its movement.

The operating mechanism for the left hand signal is substantially a duplicate of that already described, except that it is arranged in reverse relation, as best shown in Figure 4.

As the stop hand 17 has to swing thru substantially 180 degrees, or from a depending position to an upstanding position, I give the core 68 of the middle solenoid 44 a greater vertical movement so that I can make use of a crank arm 69 of the same length as the crank arm 50, and preferably cast from the same pattern. In this instance, due to the greater swing of the arm 69, I use a controlling link 70 instead of the slotted guide 63. I link the outer end of the crank arm to the upper end of the core link 48' by means of a short vertical link 71 pivotally connected to the upper end of the link 48' by the pivot 72, and I pivotally connect one end of the controlling or guide link 70 to the other two links upon the pivot 72. The opposite end 73 of the guide link 70 is mounted upon a fixed pin 74, and is provided with a longitudinal slot 75 to permit a limited endwise movement of the link 70. The construction is such that the weight of the several parts tends to force the linkage to the right, (Figure 4), and to hold the link 70 forced to the right hand as far as the slot 75 and pin 74 will permit, so that the first effect of upward pressure on the core 68 is to force the linkage to the left to the extent permitted by the slot 75. This sidewise movement of the upper end of the link 48' is for the purpose of locking and unlocking the mechanism, which I accomplish as follows: I provide a notch 76 in the edge of the link 71 which is formed in the edge toward the link 70. This notch has an inclined upper wall and a lower wall which is at substantially right angles to the length of the link, and I provide a projection 77 fixed upon the wall 10 and in position to engage in the notch 76 when the stop hand 17 is within the housing. It is obvious that as any movement of the hand 17 to swing outwardly in its pivot when hanging in its withdrawn position will tend to lift the link 71, this tendency will be prevented by the projection 77 engaging the lower edge of the notch 76, which is arranged to right angles to such movement of the link. When, however, force is applied to the core 68 to lift the same, the first tendency, on account of the pivot 72 being out of alignment with the core 68 is to move the upper end of the link 48' to the left, and thus swing the lower end of the link 71 to the left, and unlock it from the projection 77; thereafter the linkage will rotate the crank arm 69 through substantially 180 degrees to the position shown in full lines, Figure 22, the linkage being controlled in such movement by the controlling link 70, which causes the upper end of the link 48' to travel substantially in a circle about the stop pin 74 as a center, and draws its upper end in close to the center of the pivot pin 22 at the upper limit of its movement, in which position it acts through the link 71 to cause the throw of the stop hand to its upper limiting or vertical position.

In this form of linkage I provide a limit stop on the hand itself as the latter part of the travel or movement of the hand in being raised, is considerably multiplied, and a limit stop on the linkage would not be so effective. This stop comprises a tongue 78 bent up on one edge of the pivoted end of the signal 17 and adapted to contact with a fixed stop 79 secured to the wall 10 in the path of same.

Figure 21:
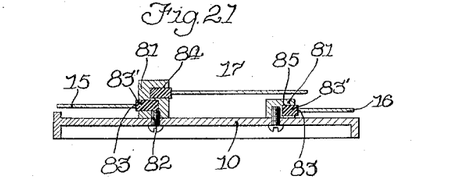
Figure 21 is a detail horizontal sectional view on the line 21—21 of Figure 5.

To stop the several signals when they drop from their indicating positions, I provide stops which are arranged to prevent any metallic click at this point, and which are arranged to stop the signals when they fall completely within the housing. These stops comprise blocks 80 and 81, best shown in Figures 5 and 21, the block or stop 80 consisting of a stop member secured to the wall 10, and arranged in the path of the direction hand 15 and the stop indicating member 17, and secured to the wall by a screw 82. To deaden the fall of the indicators, I provide yielding contacts 83 comprising soft rubber blocks 83' forced into notches 84 provided in the opposite edges of the block 80 and in alignment with the two signal members. This single stop can serve for both of the members as they swing in opposite directions. The stop 81 is similar, but is provided with but a single yielding stop member 85 for the direction hand 16, and is secured to the wall 10 in a similar manner.

For illuminating the two indicators, the stop signal and the forward face of the casing, I provide a small electric lamp 86, mounted on the front cover member 6 near the top thereof, and substantially on the level of the direction signals when they are in indicating positions. I provide an insulation plug 87 mounted within a boss 88 projecting outwardly from the cover member 6, and held in position by a set screw 89. This plug carries a tubular socket 90 for receiving the base of the lamp 86, and is provided with two spring pressed connectors 91 for delivering current to the lamp. I provide a lantern guard 92 for the lamp 86, having preferably four openings 93 for the escape of the light, to permit the light to shine out sidewise onto the direction hands when they are in indicating position, also to shine upwardly upon the stop hand when projected, and to shine downwardly upon the casing. As the casing preferably consists of polished aluminum, the light shining upon it is reflected and aids in calling attention to the device as a whole and to the signal displayed. The lantern guard is covered on its outer end both to prevent the outward projection of the light which might confuse a beholder and also to serve as a reflector to reflect the light rays back upon the signals and the casing. I find that I am enabled to obtain sufficient illumination for night use with a relatively small lamp, and I am thus enabled to conserve the electric current. For mounting the lantern guard 92 I provide it with a cylindrical inner end 94 fitting within an enlargement 95 of the bore of the boss 88, and held in position by a set screw 96.

Figure 11:
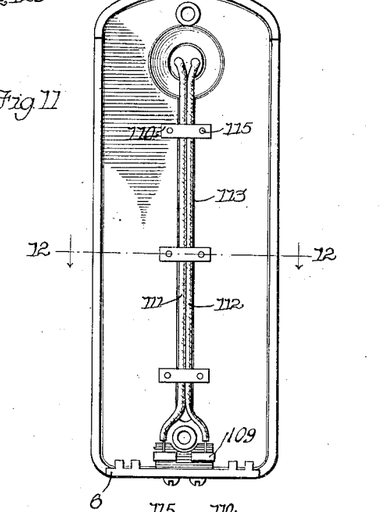
Figure 11 is an inner elevation of the cover of the front indicator.
Figure 12:
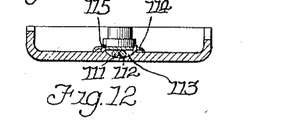
Figure 12 is a horizontal section on the line 12—12 of Figure 11.

For automatically causing the illumination of the lamp 86 when one or more of the signals is exposed, I provide an automatic circuit controller of very simple design. This controller comprises a yielding switch bar 97, (Figure 4), which is mounted between two insulation plates 98 which are clamped between two metallic plates 99. These plates 99 are metallically joined and clamped together and upon the insulation bars and the yielding switch bar by suitable rivets 100. The plates 99 are provided with supporting feet 101 by which the structure is secured to an insulation or switch base 102 by screws 103. This device is arranged between the lower ends of the cores of the solenoids and upon the upper end of the yielding bar 97 I provide a soft iron hammer-like head 104 centrally supported on the bar 97 and extending laterally toward the two adjacent solenoid cores. The plates 99 have extensions 105 at their upper ends beyond the insulation plates 98, and their extreme upper ends are formed inwardly to provide opposed contacts against which the yielding switch bar 97 is adapted to be forced. The mass of iron in the hammer-like head 104 is sufficient to cause the bar 97 to be deflected, due to the pull of the magnetism of the core of the solenoid which is energized, to display a signal. In the rear signal device I provide two of these switch devices, one arranged at each side of the central core, so that whichever signal is operated, contact will be made between one or the other of the switch bars 97 and an associated contact. I suitably connect all of the contacts 105 together and connect them to a source of current, and I suitably connect the switch bars 97 to one of the contacts 91 of the lamp, the opposite terminal of the lamp being connected to the source of current, so that when any one of the signals is displayed the lamp 86 will be illuminated, when current is supplied to the circuit containing the switches and the lamp. The connecting plate or switch base 102 is mounted upon the wall 10, and serves as a base for the various connections which it is necessary to provide for the solenoids, etc., and I provide a suitable opening 106 in the bottom wall of the rear cover member 8, through which to introduce the several wires, preferably in the form of a suitable cable, which are necessary for the proper operation of the device. For connecting these switches with the lamp, I preferably provide two insulated connection posts 107 and 108 mounted in the lower part of the wall 10 and projecting thru same, as is shown in Figure 3. These posts comprise screws insulated from the wall 10, the heads being arranged on the front side of the wall 10 and adapted to contact with suitably yielding contacts 109 carried by the cover plate 6 on a suitable insulated block 110. I connect the contacts 109 with the yielding contacts 91 of the socket of the lamp 86 by wires 111 and 112, Figures 3, 11 and 12. I preferably provide a vertical central shallow groove 113 on the inner face of the front cover of the casing to receive these wires, and I secure them in this groove by small, flat insulation straps or pieces 114. To secure the straps 114 in position I provide small projections 115 cast upon the inner surface of the cover, and I make holes in the straps adjacent to their ends to receive these projections, and after placement of the straps in position on the projections, I rivet down the ends of the projections. This manner of securing the wires 111 and 112 is very simple and effective.

For mounting the rear indicator, I provide an adjustable bracket, so that I can set the indicator in true vertical position, regardless of the curvature of the mud guard 2 upon which it is secured. This mounting consists of a curved arm 116, having a flat securing base 117 for fastening the arm upon the back of the rear cover 8 of the rear indicator, and a second curved arm 118 having a flat base 119 for securing this bracket upon the rear curved surface of the mud guard 2. I pivotally connect the free ends of these two arms by means of a transverse bolt 120, providing the free ends of the two arms with opposed radially corrugated palms 121 adapted to be held in circumferential interlocking engagement by the transverse bolt 120. As an additional means of support, I provide sheet metal angle brackets or connectors 122 adapted to be secured to the lower corners of the cover member 8 by screws 123 and similar angle brackets 124 adapted to be secured to the rearwardly projecting flanges 126 of the brackets 122 by bolts 127. The second flanges 128 of the angle brackets 124 preferably project towards each other, and as these brackets are pivotally mounted on the brackets 122 they can be adjusted to contact properly with the adjacent curved surface of the mud guard 2, and I provide these flanges 128 with holes 129 to receive bolts for securing them to the mud guards.

For mounting the forward indicator upon the radiator, I provide a rearwardly projecting clamping yoke or member 130 mounted rigidly on the rear cover member of the front indicator, and having rear forked ends 131 adapted to engage and embrace the filling nozzle 132 of the radiator 4. I make this bracket long enough so that when it is secured to the filling nozzle the body of the indicator will hang in front of the radiator 4. I secure the bracket 130 to the nozzle by means of a curved clamping strap or member 133, the ends 134 thereof being threaded and adapted to project thru suitable openings provided in the outer ends 135 of the yoke 131, and to be tightly drawn into place upon the nozzle by nuts 136. In order to prevent an undue or fracturing strain on the nozzle, 133, of the radiator 4, or on the securing bracket, I provide adjustable means at the lower end of the indicator for holding it in place. This adjustable means consists of a transverse bar 137 offset forwardly at its ends, and adjustably mounted on the back of the casing of the indicator 3 by means of screws 138 threaded into suitable openings provided in the casing and held in adjusted positions by jamb nuts 139. I provide the ends of the strap 137 with openings to receive the bolts 138, and I clamp the bar 137 beneath the heads 140 of the bolts 138 by jamb nuts 142. The strap 137 is adapted to contact with the face of the radiator and, to prevent this contact damaging the radiator, I cover the contacting portion of the strap with leather 143, or other suitable protecting material. I arrange the indicator 3 far enough from the face of the radiator so that the air can circulate freely around the casing of the indicator and enter the openings of the radiator. In installing the front indicator upon a car, I secure the upper end of the indicator to the nozzle by the bracket 130, and clamp 133, and then I relieve the nozzle of the leverage produced by the weight of the indicator by adjusting the support 137 back against the face of the radiator until I slightly lift the indicator 3. Under this condition the indicator is held rigidly in place, and the jarring of the automobile over rough roads cannot loosen it or damage either it or the radiator.

As the forward indicator 3 does not carry a stop indicator, but only the two direction signals, I eliminate the middle solenoid and one of the electro-magnet switches, and I am enabled to reduce the width of the casing in proportion.

Figure 8:
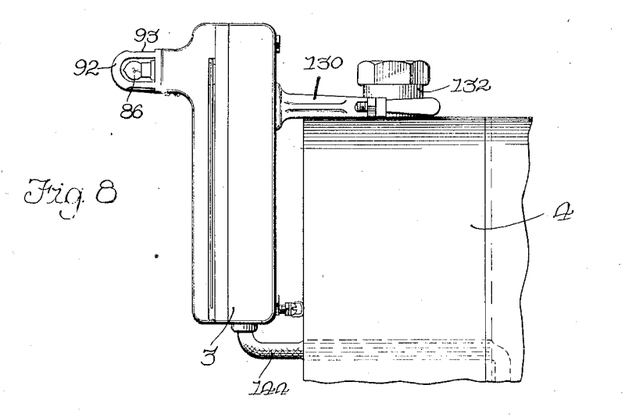
Figure 8 is an enlarged side elevation of the forward indicator shown mounted on the radiator.
Figure 9:
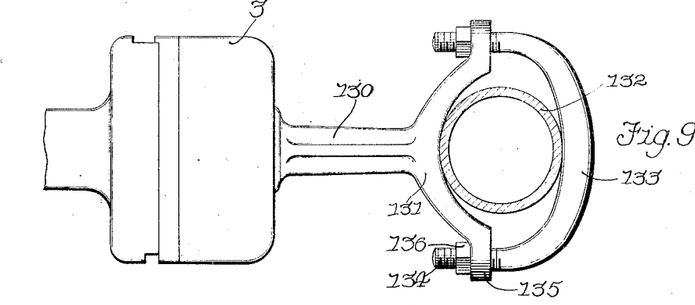
Figure 9 is a top plan view of the front indicator particularly illustrating the clamp for mounting it upon the radiator filler nozzle.
Figure 10:
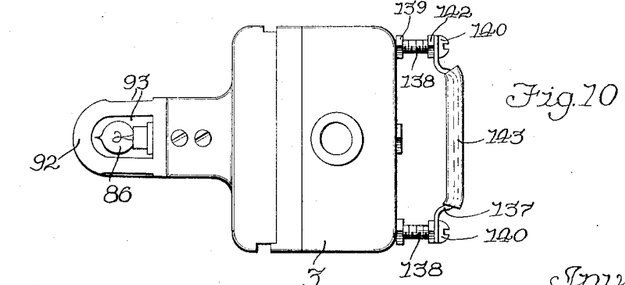
Figure 10 is a bottom plan view of the front indicator illustrating the adjustable support at the lower end of the casing for contacting with the front of the radiator.

While I may conduct the wires 144 to the indicator in many different ways, I prefer to split up the cable into which I bind these wires, and to draw them preferably thru the honeycomb openings of the radiator, as illustrated in dotted lines in Figure 8.

I preferably operate my indicators by current derived from the usual lighting storage battery, or other suitable source of current, and I preferably provide suitable quick break circuit closers 145 and 146 for manually operating the indicators, and I arrange these circuit closers in any position convenient to the driver, as, for instance, on the steering post beneath the steering wheel.

As there are a number of wires which it is necessary to connect to each of the indicators, I preferably provide a connecting block 147 which I preferably arrange on the front of the dash 148 beneath the hood 149. For the purpose of automatically throwing the stop signal 17 when the brakes are applied, I provide a circuit closer 150 preferably arranged on the lower part of the dash, and connected to the brake rod, so that it is held in circuit open condition at times when the brakes are not applied, and automatically closes the circuit to the rear indicator 1 to operate the stop hand when the brakes are set to stop or slow down the car.

Figure 17:
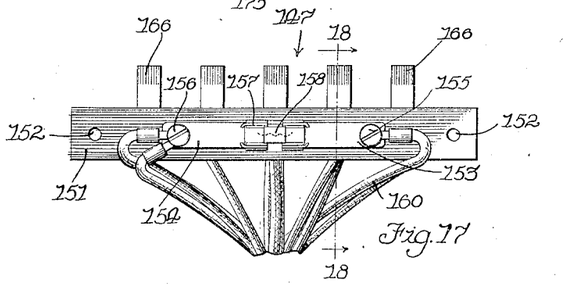
Figure 17 is a side elevation of the wire connection device which I use to simplify the installation.
Figure 18:
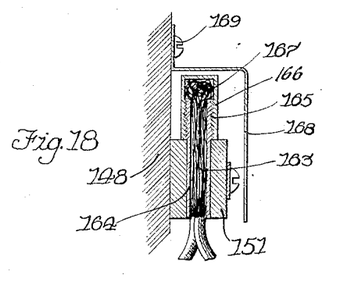
Figure 18 is a vertical sectional view of the connector on the line 18—18 of Figure 17, showing the device installed upon the dash of the automobile.
Figure 19:
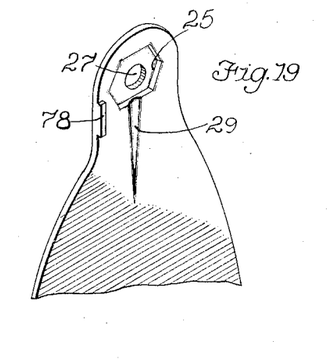
Figure 19 is a fragmentary perspective view of one of the indicator hands, particularly illustrating the means which I employ for rigidly mounting the sheet metal hands on their pivots.

My improved connector block 147 comprises an insulation base 151, (Figure 17), provided with holes 152 for securing it to dash 148. Upon the face of the block I secure the plate connectors 153 and 154 by screws 155 and 156 respectively. The inner ends of these contacts are provided with spring tongues 157 for mounting a suitable tubular fuse 158 connecting them. The connector 153 is connected to the battery 159 by the wire 160 and the connector 154 is adapted to deliver current to the automatic switch 150 and the switches 145 and 146 by wires 161 and 162 respectively. I preferably run the various wires from the battery, the indicators, the circuit closing switches, etc., substantially all of them directly to the connector block, and make the connections of the various wires at the connector block. For this purpose, I provide a form of wire connector with which I avoid the use of soldered connections between the wires. The wires which I use comprise a metal wire core composed of a number of strands 163 of fine flexible wire, and to connect two or more of such conductors together, I provide a number of tubular connectors 164 mounted in the block 151, their upper ends 165 projecting above the top surface of the block and externally screw threaded to receive the internally screw threaded tubular caps 166. These caps are closed at their upper ends and are adapted to screw down on the free ends of the tubes 164. The lower end of the cap 166 is adapted to contact with the upper surface of the block 151 with sufficient friction to prevent the backing off of the cap when once set. I project the several conductors up thru the tubular connector 164, and I twist the free ends of the several wires 163 together to form a compacted mass 167 large enough to prevent its withdrawal thru the tubular connector 164, and I then screw down the cap 166 upon this mass and bind it tightly between the cap 166 and the upper end of the tube 164. Once this mass is thus clamped in position, the several conductors are tightly bound together, and an excellent connection is made between the several wires thus connected. In installing the connector upon the dash 148, I preferably protect the connector by a sheet metal cover 168 secured to the dash by the screws 169.

Figures 13, 14:
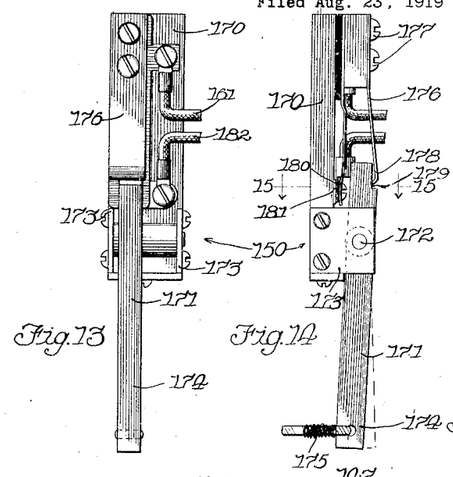
Figure 15:
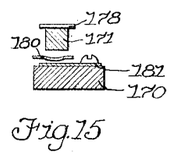
Figures 15 and 16 are vertical sectional views on the line 15—15 of Figure 14 of the circuit breaker, showing respectively an open and a closed circuit.
Figure 16:
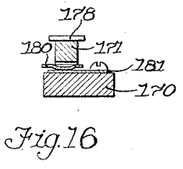

My automatic switch 150 comprises an insulation block or base 170 upon which I pivotally mount a lever 171. The lever 171 is pivoted between its ends on the pivot 172 arranged adjacent to one end of the base 170, and which pivot is mounted in two upstanding lugs 173. The outer or free end 174 of the lever 171 is connected by a wire cable 175 to the brake rod 176', Figure 1, and is so arranged that the lever 171 is held in the full line position shown in Figure 14 at times when the brakes are not set. For moving the lever to the dotted position when the brakes are set and the pull on the cable 175 is released, I provide a flat spring 176 which is rigidly mounted on the opposite end of the base 170 and secured by screws 177. The free end 178 of the spring engages on top of the inner end 179 of the lever 171 and tends to press the end 179 toward the base block 170. For causing said movement of the lever 171 to close a circuit and thus operate the stop hand I provide a spring contact tongue 180 mounted upon the base and having its free end projecting beneath the end 179 of the lever 171, and projecting above a fixed contact plate 181 secured to said base 170. And I connect the wire 161 to said contact 180, and a wire 182 to the contact 181 to deliver current to the solenoid 44 to operate the stop signal 17. Normally the lever 171 is held back against the pressure of the spring 176 by the strain of the brake mechanism, but when the brake lever 183 is operated to set the brake the strain on the cord 175 is released, and the spring 176 forces the lever 171 into contact with the yielding contact 180 and forces it down into contact with the fixed contact 181, thus closing the circuit to the stop hand solenoid. As soon as the brake is released the pull on the cord 175 returns the lever 171 to its full line position, the circuit is broken between the contacts 180 and 181, and the stop signal drops to its non-indicating position within the case of the indicator.

Figure 23:
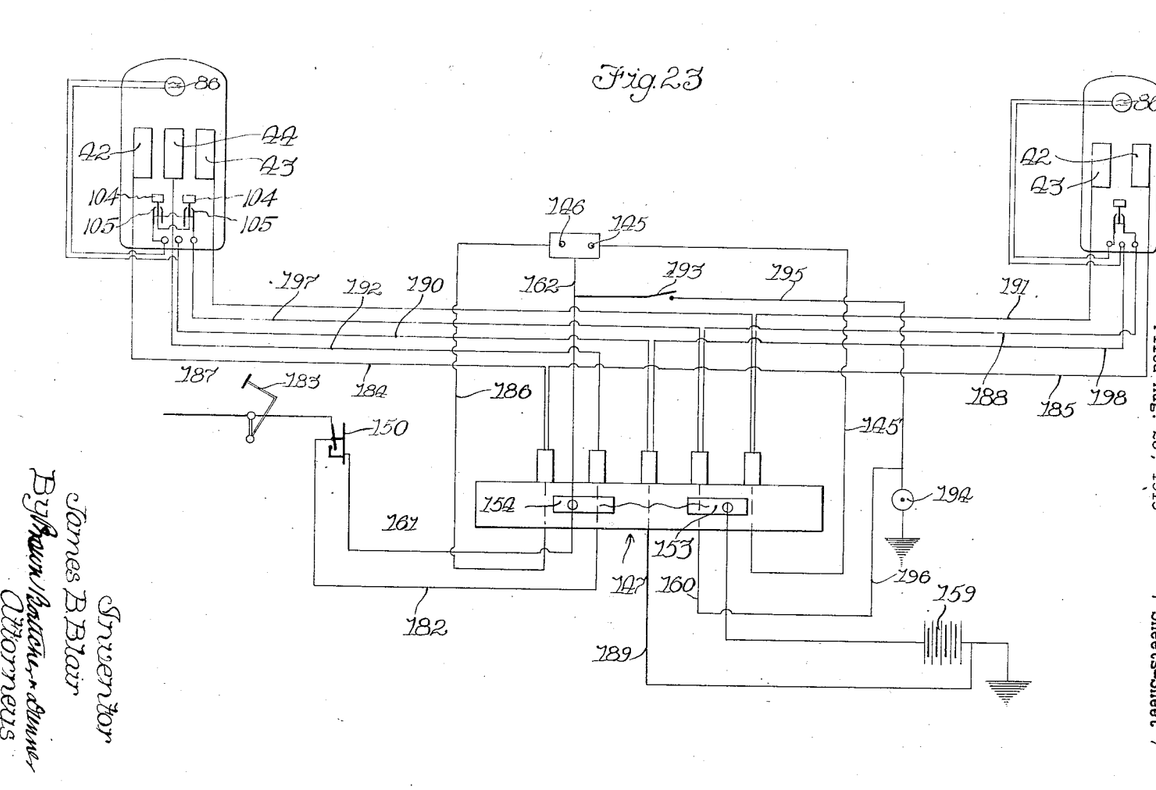
Figure 23 is a wiring diagram of the several circuits.

In Figure 23 I have illustrated the circuits for operating the several signals.

As hereinbefore described, the storage battery 159, or other source of current, is connected to the contact 153 on the contact block 147, and current passes to the contact 154 and to the automatic circuit breaker 150 and the switches 146 and 145 thru the wires 161 and 162.

I connect the left hand solenoid 42 of the rear indicator with one of the connectors 166 on the contact block 147 by the wire 184. I connect the right hand solenoid 42 on the forward indicator to the same connector by a wire 185, and I connect the left hand circuit closer 146 to the same connector by a wire 186. I provide a common return wire 187 grounded to the rear indicator and a common return wire 198 grounded to the forward indicator, both of which I connect with another one of the connectors 166, and I also connect this same connector to the opposite or grounded side of the battery 159 by the wire 189, so that when I close the circuit at 146, both of the right hand indicators will be displayed.

In like manner I connect the right hand circuit closer 145 to one of the connectors 166 by a wire 145', and I connect the right hand solenoid 43 of the rear indicator and the right hand solenoid 43 of the front indicator to the same connector by wires 190 and 191, so that when I close the circuit at 145 both left hand signals will be displayed.

I connect the stop hand solenoid 44 of the rear indicator to one of the connectors 166 by the wire 192, and I connect the contact 181 of the automatic circuit breaker 150 with the same connector by the wire 182, so that when the circuit is closed by the device 150 the stop signal will be displayed.

In Figure 23, 193 indicates a switch for closing the usual tail light circuit, which includes the tail light 194. The switch is connected to the tail light by the wire 195. I connect one of the connectors 166 to the wire 195 by the wire 196, and I connect the same connector with the contacts 105 in the rear indicator by the wire 197 and with the contacts 105 in the front indicator by the wire 188, and by means of the magnetically operated circuit closers 104 in the two indicators, the lamps 86 are illuminated at times when any of the indicators are operated and the switch 193 in the tail light circuit is closed.

As it is evident that many modifications of my invention will be readily suggested to those skilled in the art, I do not intend to limit my invention to the specific structures herein shown and described, except as defined in the appended claims.

I claim:

1. In an indicator of the kind described, a casing, a stop signal adapted to be swung from depending position within the casing to an upstanding indicating position, a pivot on which the signal is mounted, and means for swinging the signal through an arc of substantially 180°, said means comprising a crank arm on the pivot, a link connected to the crank arm, a vertically movable operator within the casing, an operating link connecting the operator with the first link, a second link pivotally connected to the two links at their pivotal connection, its opposite end being pivotally mounted on said casing to control said first link during the operation of said stop signal.

2. In combination, front and rear casing sections, an intermediate mounting plate, a bearing hub on said mounting plate, a stub shaft supported solely by said bearing hub, an indicating target fixedly secured to the front end of said stub shaft, a crank arm fixedly secured to the rear end of said shaft, said crank arm in its normal position projecting diagonally downward towards the side of said mounting plate, a solenoid supported entirely on said mounting plate in substantially vertical relationship, a core reciprocable vertically in said solenoid and normally projecting from the lower end of its solenoid, link mechanism pivotally connected between said core and said crank arm, said link mechanism transmitting upward movement of its core to said crank arm for revolving the indicating target out to indicating position, and a lateral slot in said front casing section for permitting swinging motion of said indicating target into and out of said casing section.

3. In combination, a rotatable signal, a crank arm on said signal, a reciprocatory source of power, a link pivoted to said source, a second link pivotally connected to said first link and to said crank arm, and means for guiding the pivot connecting said links in a curved path to keep said linkage out of a dead center position.

4. In a signalling device of the class described, the combination of supporting and enclosing means comprising a front casing section, a rear casing section, an intermediate mounting plate, said casing sections separating on substantially the plane of said intermediate mounting plate and being secured thereto, a stub shaft journaled in said mounting plate, a signaling arm secured to the front end of said stud shaft, a crank arm secured to the rear end of said stub shaft on the reverse side of said mounting plate, a solenoid supported on the rear side of said mounting plate, and link mechanism operatively connecting said solenoid with said crank arm, said solenoid, stub shaft, signalling arm, crank arm and link mechanism being carried in their entirety on said mounting plate, whereby said casing sections can be removed without disturbing the operability of the mechanism supported on said mounting plate.

5. Is a signalling device of the class described, the combination of a mounting plate, front and rear casing sections separating on substantially the plane of said mounting plate, a bearing hub integral with said mounting plate, a shaft supported entirely in said bearing hub independently of said casing sections, a signalling arm secured to the front end of said shaft, a crank arm secured to the rear end of said shaft, a solenoid supported entirely on the rear side of said mounting plate independently of said casing sections, a core reciprocable in said solenoid and normally projecting from the lower end of said solenoid, link mechanism pivotally connected between each of said cores and said crank arm, said link mechanism transmitting upward movement of said core towards said crank arm for revolving said corresponding signalling arm out to indicating position, and slotted means in said front casing section for permitting the in-and-out movement of said signalling arm.

6. In a signalling device of the class described, the combination of a central mounting plate, front and rear casing sections terminating substantially at said plate and being secured thereto, a bearing hub formed integral with said mounting plate, a stub shaft supported entirely in said bearing hub independently of said casing sections, a crank arm secured to the rear end of said stub shaft, a solenoid supported on said mounting plate as a part of the mounting plate unit, a core in said solenoid adapted to be drawn upwardly in the energization of said solenoid, link mechanism operatively connecting said core with said crank arm, an indicating member on the front end of said shaft, one indicating member adapted to swing laterally out through a slot in said front casing section for indicating a turn of the vehicle, said indicating member being in the form of a pointing hand with the index finger extended, and stop means projecting from the front of said mounting plate and adapted to be engaged by the index finger of said indicating member for limiting the inward movement thereof.

7. In a signalling device of the class described, the combination of a mounting plate, an indicating arm pivotally mounted on said plate, electro-magnetic means mounted on said plate for actuating said indicating arm, operating means connecting said electro-magnetic means with said indicating arm and a casing for enclosing said indicating arm and said electro-magnetic means, said casing consisting in its entirety of a front casing section and a rear casing section, each of said casing sections comprising an end wall and unitary side walls projecting therefrom, the side walls of each casing section terminating substantially in the plane of said mounting plate, and screw means for securing both casing sections to said mounting plate.

8. In a signalling device of the class described, the combination of a movable signal, electro-magnetic means for actuating the same, a crank arm connected to said signal, an actuating member responsive to said electro-magnetic means, a first link pivotally connected to said actuating member, a second link pivotally connected between said first link and said crank arm, a locking shoulder on said second link, and a stop projection engaging said locking shoulder for preventing movement of said signal toward signalling position except under energization of said electro-magnetic means.

9. In combination, a movable signal, a source of power, a transmission between said power source and signal including a pair of links lying almost in alignment when said signal is not displayed, said links being urged out of alignment by said power source in moving said signal, and into alignment by movement of said signal without power, and a catch engaged by a shoulder on one of said links as the links move into alignment.

10. In combination, a movable signal, a source of power, a transmission between said power source and signal including links lying almost in alignment when said signal is not displayed, said links being urged out of alignment by said power source in moving said signal, and into alignment by movement of said signal without power, and means for limiting the buckling of said links to force it to transmit power.

11. In combination, a movable signal, a source of power, a transmission between said power source and signal including links lying almost in alignment when said signal is not displayed, said links being urged out of alignment by said power source in moving said signal, and into alignment by movement of said signal without power, a catch and an extension on one of said links positioned for sliding engagement with said catch to limit the buckling of said links.

12. In combination, a movable signal, a source of power, a transmission mechanism between said power source and signal including links lying almost in alignment when said signal is not displayed, said links being urged out of alignment by said power source in moving said signal, and into alignment by movement of said signal without power, a crank arm actuated by the final link of said transmission mechanism, and a drag link for guiding the linking pivot in a curved path to increase the arc through which said transmission mechanism can swing said crank.

13. In combination, a movable signal, a source of power, a transmission mechanism between said power source and signal including links lying almost in alignment when said signal is not displayed, said links being urged out of alignment by said power source in moving said signal, and into alignment by movement of said signal without power, a guide link pivoted to said transmission mechanism, a fixed pivot for said guide link, a catch for said transmission mechanism and a lost motion connection between said guide link and its pivot to permit said transmission mechanism to engage or clear said catch.

14. In combination, a movable signal, a crank, a source of power, a transmission including pivoted links between said power source and crank, and a guide directing the movement of the pivot between said links in a curved path.

15. In combination, a movable signal, a source of power, a transmission including links between said power source and signal, pivoted means for said links, a crank arm connected to said signal and actuated by said transmission, and a guide directing the movement of the said pivotal means in a curved path.

16. In a signalling device, in combination, a wall, a shaft extending through said wall, a signal on said shaft on one side of said wall, a crank arm on said shaft on the other side of said wall, a solenoid set below said shaft, linkage between said solenoid and said crank arm for actuating said signal, a slotted casing partially enclosing and housing said signal, but permitting it to pass through said slot and be displayed, and a separate substantially imperforate casing completely enclosing and housing said solenoid and linkage, said casings joining on substantially the plane of said wall.

17. In a signalling device, in combination, a movable signal, a solenoid coil, a reciprocatory core in said coil for moving said signal, a light for lighting said signal, a circuit for said light, and means positioned beside the path of said solenoid core and drawn laterally by the magnetic field thereof for maintaining said light circuit closed through the entire interval, said signal is in indicating position.

18. In a signalling device of the class described, the combination of an intermediate mounting plate, an integral bearing hub formed on said plate, a short shaft journaled in said bearing hub, an indicating arm secured on the front extremity of said shaft on the front side of said mounting plate, a crank arm secured on the rear extremity of said shaft on the rear side of said mounting plate, a solenoid, bracket means secured to the rear wall of said mounting plate and supporting said solenoid thereon, a core in said solenoid adapted to be raised therein in the energization of said solenoid, link means connecting said core with its corresponding crank arm, said indicating arm and the aforesaid operating mechanisms being assembled entirely on said mounting plate to form a complete operating unit thereof, a casing of front and rear casing sections, each of said casing sections comprising an end wall and unitary top, side and bottom walls projecting therefrom, the top, side and bottom walls of each casing section terminating substantially in the plane of said mounting plate, screw means for securing both of said casing sections to said mounting plate, and supporting means secured to said rear casing section for mounting the device on the car.

In witness whereof, I hereunto subscribe my name, this 15th day of April, A. D. 1919.

JAMES B. BLAIR.